(12) United States Patent
Mak et al.

(10) Patent No.: US 10,714,935 B2
(45) Date of Patent: Jul. 14, 2020

(54) SUBSCRIBER-DRIVEN SYSTEM FOR MANAGING EVENTS IN AN ELECTRICAL GRID

(75) Inventors: Don T. Mak, Reston, VA (US); Kevin M. Monagle, Wellesley, MA (US); Sri Ramanathan, Lutz, FL (US); Jean-Gael F. Reboul, Kenmore, WA (US); Matthew A. Terry, Dunwoody, GA (US); Matthew B. Trevathan, Kennesaw, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1487 days.

(21) Appl. No.: 12/984,191

(22) Filed: Jan. 4, 2011

(65) Prior Publication Data

US 2012/0173252 A1 Jul. 5, 2012

(51) Int. Cl.
*G06Q 10/00* (2012.01)
*H02J 3/00* (2006.01)

(52) U.S. Cl.
CPC .............. *H02J 3/008* (2013.01); Y04S 50/10 (2013.01)

(58) Field of Classification Search
USPC ........................................................ 705/1.1
See application file for complete search history.

(56) References Cited

U.S. PATENT DOCUMENTS 8,170,886 B2 * 5/2012 Luff ............................... 705/1.1
8,176,095 B2 * 5/2012 Murray et al. ................ 707/805
8,340,832 B1 * 12/2012 Nacke ......................... H02J 3/14
  700/286
2007/0064886 A1 3/2007 Chiu et al.
2008/0062966 A1 3/2008 den Hartog et al.
2008/0270542 A1 * 10/2008 Tu .......................... H04L 65/105
  709/206
2009/0088907 A1 4/2009 Lewis et al.
2009/0109056 A1 * 4/2009 Tamarkin et al. ......... 340/870.02
2010/0088261 A1 * 4/2010 Montalvo ....................... 706/15

(Continued)

FOREIGN PATENT DOCUMENTS

EP 2156978 2/2010

OTHER PUBLICATIONS

P. Gregory, "SIP Communications for Dummies", Avaya Custom Edition: 2006, Wiley Publishing, Inc., pp. 1-64.

(Continued)

*Primary Examiner* — Kira Nguyen
(74) *Attorney, Agent, or Firm* — James Nock; Andrew D. Wright; Roberts Calderon Safran & Cole, P.C.

(57) ABSTRACT

A system and a method are provided for managing events in a smart grid. The method is implemented in a computer infrastructure having computer executable code tangibly embodied on a computer readable storage medium having programming instructions operable to: receive a Session Initiation Protocol (SIP) notify message comprising a monitored state of at least one electrical device, from a smart meter; send a SIP publish message comprising the monitored state of the at least one electrical device, to at least one client device for management of the at least one electrical device; and determine and send a rule comprising at least one action to take in response to the monitored state of the at least one electrical device, to the smart meter.

9 Claims, 4 Drawing Sheets

(56) References Cited

U.S. PATENT DOCUMENTS

| | | | |
|---|---|---|---|
| 2010/0091768 A1 | 4/2010 | Gilbert et al. | |
| 2010/0124236 A1 | 5/2010 | Musti et al. | |
| 2010/0131329 A1 | 5/2010 | An et al. | |
| 2010/0138363 A1* | 6/2010 | Batterberry | G06Q 10/04 705/412 |
| 2010/0324962 A1* | 12/2010 | Nesler | G05B 15/02 705/7.36 |
| 2011/0050455 A1* | 3/2011 | Addy | G01D 4/002 340/870.02 |
| 2011/0196547 A1* | 8/2011 | Park et al. | 700/296 |
| 2012/0101749 A1* | 4/2012 | Garrett | G01R 22/063 702/58 |
| 2012/0105249 A1* | 5/2012 | Bauerfeld et al. | 340/870.02 |

OTHER PUBLICATIONS

W. Li, "A Service Oriented SIP Infrastructure for Adaptive and Context-Aware Wireless Services", 2003, ACM, pp. 81-88.

D. Tombroff, "Session Management in Clustered Servlet Containers",2008, 6 pages.

J. Diadamo, "SIP . . . ", http://www.smartgridnews.com/artman/publish/Technologies_Standards_News/SIP_The_Clear_Choice_for_Smart_Grid_Communication-604.html, Jun. 23, 2009, 3 pages.

* cited by examiner

SUBSCRIBER-DRIVEN SYSTEM FOR MANAGING EVENTS IN AN ELECTRICAL GRID

TECHNICAL FIELD

The present invention generally relates to a smart grid, and more particularly, to a system and a method for managing events in a smart grid.

BACKGROUND

An electrical grid is an interconnected network for delivering electricity from suppliers to consumers. More specifically, the electrical grid is a vast, interconnected network, of transmission lines, starting from a supplier of electricity to a consumer of the electricity. The consumer may be, for example, a personal consumer or an industrial consumer. It has become increasingly important to manage the electrical grid, in order to more efficiently distribute electricity in an environmentally friendly manner. For example, the electrical grid has been connected to environmentally friendlier sources such as, for example, windmills, which provide less pollutants.

SUMMARY

In a first aspect of the invention, a method is implemented in a computer infrastructure having computer executable code tangibly embodied on a computer readable storage medium having programming instructions operable to: receive a Session Initiation Protocol (SIP) notify message comprising a monitored state of at least one electrical device, from a smart meter; send a SIP publish message comprising the monitored state of the at least one electrical device, to at least one client device for management of the at least one electrical device; and determine and send a rule comprising at least one action to take in response to the monitored state of the at least one electrical device, to the smart meter.

In another aspect of the invention, a system is implemented in hardware which comprises a domain server. The domain server is operable to: receive a Session Initiation Protocol (SIP) notify message comprising a monitored state of at least one electrical device, from a smart meter; send a SIP publish message comprising the monitored state of the at least one electrical device, to at least one client device for management of the at least one electrical device; and determine and send a rule comprising at least one action to take in response to the monitored state of the at least one electrical device, to the smart meter. The monitored state of the at least one electrical device includes at least one of a consumer energy profile, identification information regarding the at least electrical device, physical state parameters of the at least one electrical device, utility billing, and critical events, at one or more locations.

In an additional aspect of the invention, a computer program product comprises a computer usable storage medium having readable program code embodied in the storage medium. The computer program product includes at least one component operable to: receive a Session Initiation Protocol (SIP) notify message comprising a monitored state of at least one electrical device, from a smart meter; send a SIP publish message comprising the monitored state of the at least one electrical device, to at least one client device for management of the at least one electrical device; and determine and send a rule comprising at least one action to take in response to the monitored state of the at least one electrical device, to the smart meter.

In a further aspect of the invention, a method of deploying a system for managing electrical consumption, comprises providing a computer infrastructure operable to: send a register message to register in a network; record a critical electrical event at a client specified location; send a notify message comprising presence information of the critical electrical event at the client specified location, to a presence server; receive a rule comprising at least one action to take in response to the critical electrical event; and perform the at least one action to take in response to the critical electrical event.

In another aspect of the invention, a computer system for managing electrical consumption comprises a CPU, a computer readable memory and a computer readable storage media. First program instructions receive a Session Initiation Protocol (SIP) notify message comprising a monitored state of at least one electrical device, from a smart meter. Second program instructions send a SIP publish message comprising the monitored state of the at least one electrical device, to at least one client device for management of the at least one electrical device. Third program instructions determine and send a rule comprising at least one action to take in response to the monitored state of the at least one electrical device, to the smart meter. Fourth program instructions to receive a SIP subscribe message requesting to subscribe to updates of the monitored state of the at least one electrical device, from the at least one client device. The monitored state of the at least one electrical device includes at least one of a consumer energy profile, identification information regarding the at least electrical device, physical state parameters of the at least one electrical device, utility billing, and critical events, at one or more locations. The first, second, third, and fourth program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
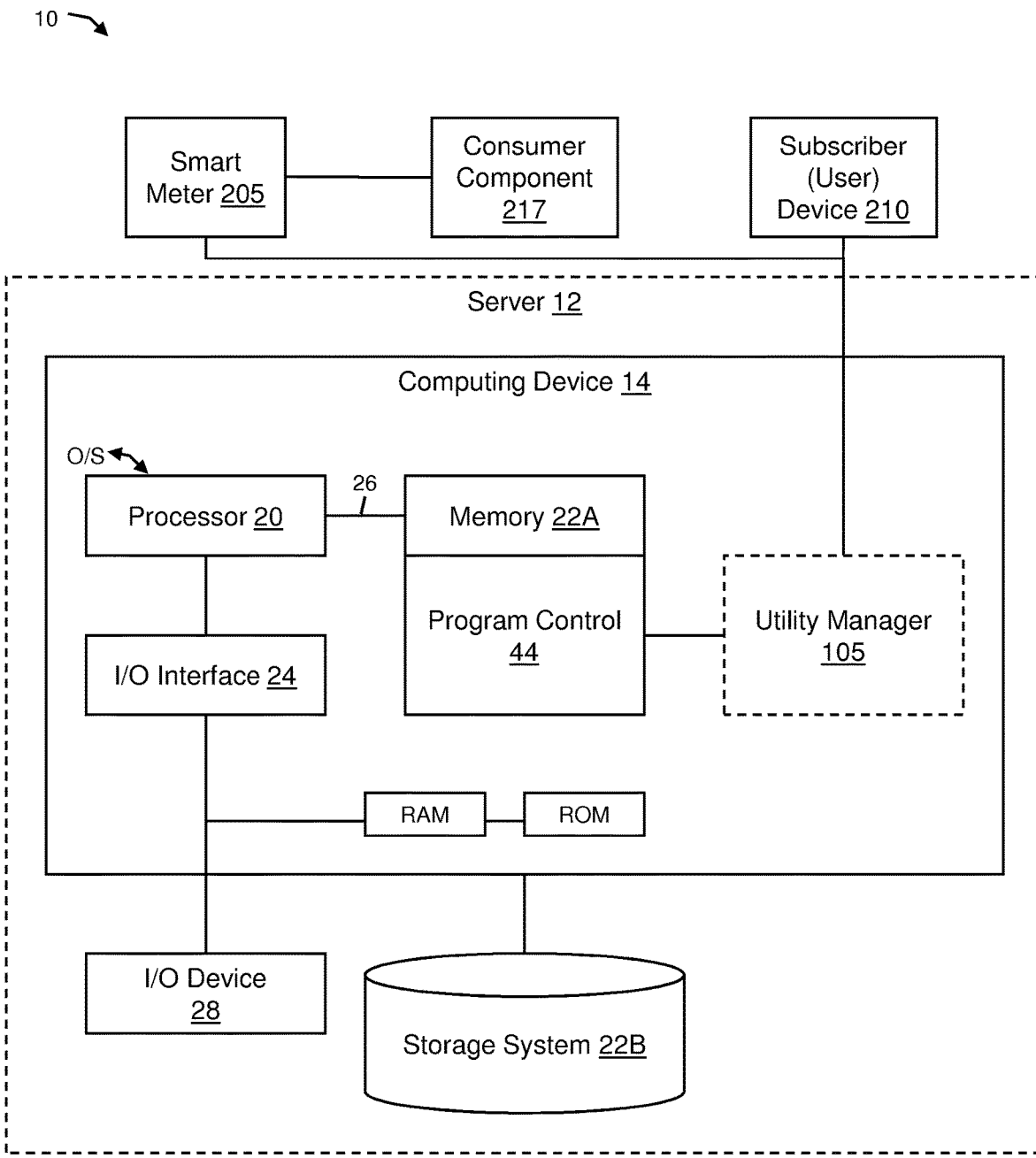
FIG. 1 shows an illustrative environment of a sever and/or a computing device for implementing the steps in accordance with aspects of the invention.

The present invention generally relates to a smart grid, and more particularly, to a system and a method for managing events in a smart grid. In embodiments, the smart grid delivers electricity from suppliers to consumers and allows the suppliers to communicate with and to control and monitor the consumers' appliances and electrical devices, to save energy and reduce costs, as well as to become more environmentally sound. The smart grid uses smart meters to record electricity consumption of the consumers' appliances and devices and to communicate this information with the suppliers or utility providers for control, monitoring, and billing purposes. For example, using the information recorded at the smart meter, the utility providers may be able to turn on and off consumer appliances, provide consumers rebates for consuming less energy, and even participate in the free trade of electricity with other utility providers. For communication between the smart meters and the utility providers, the smart grid can use session initiated protocols (SIP) to transfer information regarding the smart grid.

The smart grid has many different dimensions, which are broad and structural in nature, in which the present invention provides several changes and improvements thereto, for example, the intersections between an Internet Protocol (IP) backplane and the traditional electricity grid. In particular, the present invention provides a smart grid to place the consumers more in control of their electricity consumption decisions.

More specifically, the invention provides the Session Initiation Protocol (SIP) as a low-latency, scalable communication protocol used by the smart grid, particularly, between a smart meter at a consumer's premise or other building and an electricity supplier or utility. Further, the invention provides a presence server in a utility domain or in a telecommunications domain. The presence server allows authorized entities, such as the consumer, the utility, a network service provider, and a third party, to subscribe to events (e.g., appliance malfunction) recorded at the smart meter so as to then be able to interact with the smart grid.

Advantageously, the invention places consumers in control of electricity consumption decisions via providing them additional information (e.g., appliance events, consumption patterns, etc.) in a time-critical, reliable manner. In particular, with the additional information, consumers have the ability to manage, for example, electricity overconsumption and/or issues with their appliances or devices. In addition, the invention allows utilities and network service providers to collect information regarding the consumers and their relationships across the smart grid in order to provide more management capability related to the consumption of electricity such as, for example, smarter use of electricity across the power grid. By utilizing telecommunications technology and the Mobile Web, the smart grid is fully-integrated with and connected to the Internet and can be managed to a more granular level.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls a utility manager 105, e.g., the processes described herein. The utility manager 105 can be implemented as one or more program code in the program control 44 stored in memory 22A as separate or combined modules. Additionally, the utility manager 105 may be implemented as separate dedicated processors or a single or several processors to provide the function of this tool. Moreover, it should be understood by those of ordinary skill in the art that the utility manager 105 is used as a general descriptive term for providing the features and/or functions of the present invention, and that the utility manager 105 may comprise many different components such as, for example, the components and/or infrastructure described and shown with reference to FIG. 2.

In embodiments, the utility manager 105 provides logic for managing and/or controlling electricity consumption of a consumer appliance or other electric device 217, e.g., component, machinery, etc., within a smart grid. In embodiments, a smart meter 205 is connected to the consumer appliance 217 for monitoring and recording electrical consumption and/or other events such as, for example, malfunctions, problems, and/or electrical faults with respect to the appliance 217. A subscriber (user) device 210, e.g., a smartphone, a personal computer (PC), and/or a laptop, etc., is in communication with the utility manager 105 and/or smart meter 205 for managing electricity consumption over the smart grid.

More specifically, in embodiments, the subscriber (user) device 210 can receive messages from the utility manager 105 and send messages to the utility manager 105, in order to manage the appliance 217, e.g., managing the electrical consumption of the appliance. For example, the subscriber (user) device 210 can send notifications to the utility manager 105 regarding the managing of electrical consumption in a house or other location, via the use of the smart meter 205. Illustratively, through SIP messaging, the subscriber (e.g., user) 210 can instruct the utility manager 105 to turn off an appliance, e.g., air conditioner, using the logic of the smart meter 205. Also, through the use of rules, stored in the storage system 22B for example, the subscriber (user) device 210 can instruct the utility provider to control electricity consumption by programming electricity consumption for only a specific period of time, for specified appliances. The rules may also indicate what constitute critical events at a subscriber's premise or other designated location to manage the appliance upon the occurrence of the event. Accordingly, management of electricity consumption may be accomplished via the smart meter 205 through the communication with the utility manager 105.

While executing the computer program code, the processor 20 can read and/or write data to/from memory 22A, storage system 22B, and/or I/O interface 24. The program code executes the processes of the invention, for example, functions of a presence server, e.g., managing events in a smart grid. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
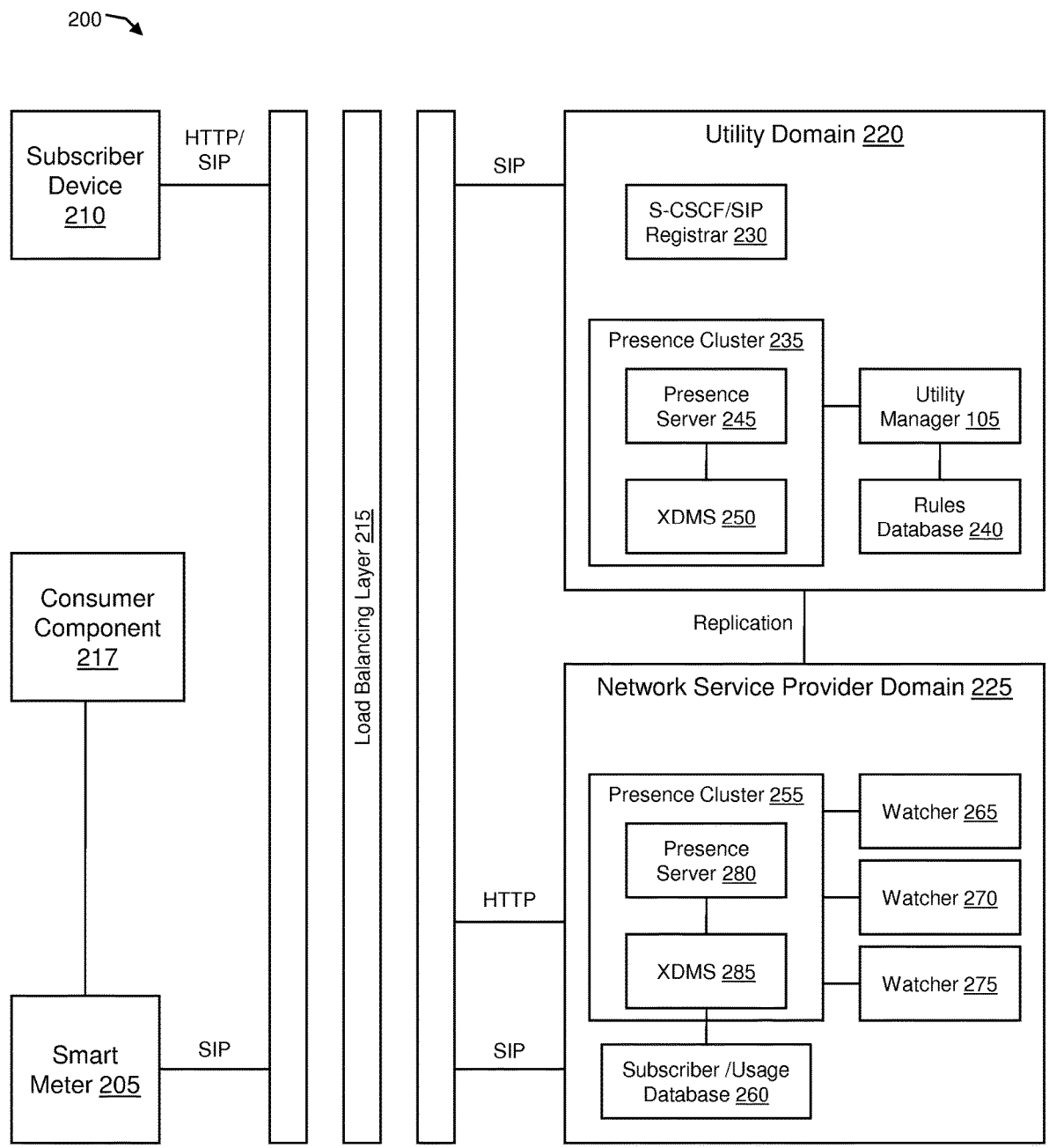
FIG. 2 shows another illustrative environment for implementing the steps in accordance with aspects of the invention.

FIG. 2 shows another illustrative environment 200 for implementing the steps in accordance with aspects of the invention. The environment 200 includes the smart meter 205, the subscriber device 210, a load balancing layer 215, the consumer component 217, a utility domain 220, and a network service provider domain 225. The smart meter 205 is a component of and connected to a smart grid including electricity suppliers or utilities connected and providing electricity to consumers, e.g., their appliances. The smart meter 205 records consumer electricity consumption and appliance or device events, such as malfunctions, problems, and/or electrical faults with respect to appliances or electrical devices (e.g., the consumer component 217). In embodiments, the smart meter 205 may be an Automated Metering Infrastructure (AMI) meter. The smart meter 205 includes a lightweight SIP client and a radio antenna connected to the SIP client, allowing the smart meter 205 to communicate in SIP with other entities that can also communicate in SIP, such as the subscriber device 210, and the domains 220, 225.

In embodiments, the subscriber device 210 may be any device that interfaces with a subscriber or electricity consumer, e.g., a smartphone, a personal computer (PC), and/or a laptop. Like the smart meter 205, the subscriber device 210 also includes a lightweight SIP client and a radio antenna connected to the SIP client, which allow the subscriber device 205 to communicate in SIP with other entities that can also communicate in SIP. In embodiments, the subscriber device 210 may also include a web client that allow the subscriber device 205 to communicate in Hypertext Transfer Protocol (HTTP) with other entities that can also communicate in HTTP, such as the network service provider domain 225.

The smart meter 205 and the subscriber device 210 communicate with domains 220, 225 via a load balancing layer 215 that may distribute data (e.g., a load) evenly between the above entities. For example, the load balancing layer 215 may be provided in a network switch and a gateway router, which may be implemented in the computing device 14 of FIG. 1. The load balancing layer 215 includes an SIP client and a web client such that the load balancing layer 215 is able to communicate in SIP and HTTP with other SIP-enabled and/or HTTP-enabled entities.

The utility domain 220 is a network domain of an electricity supplier or utility provider. In embodiments, the utility domain 220 may include a Serving Call Session Control Function (S-CSCF)/SIP registrar 230, a presence cluster 235, the utility manager 105, and a rules database 240. The S-CSCF/SIP registrar 230 is a SIP server that controls SIP sessions between the smart meter 205, the subscriber device 210, and the domains 220, 225. In particular, the S-CSCF/SIP registrar 230 handles SIP registrations of the smart meter 205 and the subscriber device 210. So, over and above a Mobile Subscriber Integrated Services Digital Network Number (MSISDN) of these entities, they are registered as IP Multimedia Subsystem (IMS)/SIP clients in the domains 220, 225. In embodiments, the S-CSCF/SIP registrar 230 may be implemented in the server 12 and/or the computing device 14 in FIG. 1, and may be alternatively located in the network service provider domain 225 and/or a third-party location. After registration, the S-CSCF/SIP registrar 230 forwards SIP messages from the smart meter 205 and the subscriber device 210 to components in the domains 220, 225, such as the presence cluster 235.

The presence cluster 235 includes a presence server 245 and an Extensible Markup Language (XML) Data Management Server (XDMS) 250. The presence server 245 is a SIP application server that communicates and stores presence information of client devices, such as the smart meter 205 and the subscriber device 210. The presence server 245 may be implemented in the server 12 of FIG. 1. Specifically, the presence server 245 receives SIP notify messages including the presence information from the client devices. In the case of the smart grid, the presence information may include, for example, a status indicator of the smart meter 205 that indicate an appliance energy consumption ("an energy profile"), an appliance malfunction, or other critical events at a respective premise or house.

With this received presence information, the presence server 245 sends the presence information to the XDMS 250 that builds or updates a presence document including the presence information. This presence document may include the presence information of all appliances, electrical devices, energy profiles, physical state parameters, and utility billing at a specific premise or node. In embodiments, the presence document may include multiple nodes, or in other words, the presence document may refer to multiple premises and their associated smart meters. In embodiments, the presence document and the SIP messages may be in a XML format, a Rich Presence Information Data (RPID) format, and/or a Presence Information Data Format (PDIF). The XDMS 250 may be implemented in the server 12 of FIG. 1.

Additionally, the presence server 245 receives SIP subscribe messages from the client devices, particularly, the subscriber device 210 and the utility manager 105. The SIP subscribe messages are requests to receive (e.g., to subscribe to) updates about the presence information from the presence server 245. The presence server 245 manages these SIP subscribe messages from the client devices and when there is an update about the presence information, the presence server 245 automatically sends SIP publish messages quickly and effectively to the subscribing client devices (e.g., the subscriber device 210 and the utility manager 105) that include the presence information. The presence server 245 may send information regarding the subscribing client devices ("subscriber presence information") to the XDMS 250, which may then update a corresponding presence document to include such subscriber presence information. As a result, the presence document may include information regarding relationships between smart meters, appliances, and electrical devices at premises and subscribing client devices interested in receiving updated presence information with respect to these entities at the premises. That is, the presence document can associate each of its nodes to a subscriber, enabling enhanced utility data tracking with tight association to the specific subscriber that may be responsible for one or more smart meters.

The rules database 240 includes and stores rules set by a consumer or subscriber regarding control of electricity consumption at his or her premise or other designated location. For example, the rules may indicate that the subscriber has allowed the utility provider to control electricity consumption, has programmed electricity consumption for only a specific period of time, or has programmed electricity consumption to be in his or her complete control. The rules may also indicate what constitute critical events at a subscriber's premise and thus, include event lists and event categories. The control of electricity consumption may be accomplished via the utility manager 105 controlling the smart meters at the premise, e.g., the smart meter 205. In embodiments, the rules database 240 may be set by the subscriber via the subscriber device 210.

The network service provider domain 225 is a network domain of an Internet service provider and/or a cellular service provider. In embodiments, the network service provider domain 225 may include a presence cluster 255, a subscriber/usage database 260, and watchers 265, 270, 275. The presence cluster 255 includes a presence server 280 and a XDMS 285, which perform functions similar to those of the presence server 245 and the XDMS 250 in the utility domain 220. In fact, all information (e.g., the presence information and the subscriber presence information) received and processed in the presence server 245 and the XDMS 250 in the utility domain 220 may be transferred to or replicated in the presence server 280 and the XDMS 285 in the network service provider domain 225, and vice versa. In embodiments, replication in the domains 220, 225 may be accomplished via peering and dedicated bandwidth between the domains 220, 225. In embodiments, the presence servers 245, 280 may be in a hierarchal relationship, for instance, where the presence server 245 is a primary, master server and the presence server 280 is a secondary, slave server.

The subscriber/usage database 260 receives the built or replicated presence documents from the XDMS 285 and stores the presence documents for the system. The watchers 265, 270, 275 are entities in the network service provider domain 225 that send SIP subscribe messages to the presence cluster 255 to subscribe to updates regarding the presence information in the presence server 280, e.g., the SIP publish messages. For example, one of the watchers 265, 270, 275 may represent the utility provider, and may be implemented in the computing device 14 in FIG. 1. By subscribing to the SIP publish messages, the watchers 265, 270, 275 are able to watch for notifications of critical events at premises (or other locations, generally) from smart meters. In addition, the watchers 265, 270, 275 are able to react to these notifications as necessary. For instance, if the watcher 265 represents the utility provider and observes a notification of an electrical fault at a premise from the smart meter 205, the watcher 265 may cut utility accounting records so that any chargebacks can be automatically adjusted as part of settlement processes every billing cycle.

In embodiments, presence infrastructure (e.g., the presence cluster 255) may be only present in the network service provider domain 225, and a watcher (e.g., the utility manager 105) may be only present in the utility domain 220. In other words, the utility manager 105 may correspond to a watcher. In this embodiment, the utility manager 105 may subscribe to all presence information updates or events and reacts as necessary. To transfer information, the domains 220, 225 may include dedicated bandwidth between the two sides. In embodiments, the presence infrastructure may include multiple presence clusters for different types of devices, such as subscriber devices, smart meters, and watchers.

In embodiments, a third-party watcher may be hosted in a third-party environment, which is completely configurable by a consumer or subscriber. Specifically, the subscriber may configure how the environment infrastructure could react to notifications of critical events or energy consumption patterns as necessary. For example, the infrastructure could react to a notification of an appliance malfunction by turning the appliance off. The infrastructure may be implemented in the server 12 and/or the computing device 14 in FIG. 1.

In operation, the environment 200 of the invention allows a subscriber to receive a SIP publish message or notification on his or her mobile device (e.g., the subscriber device 210) from a watcher (e.g., the watchers 265, 270, 275, and/or the utility manager 105). For example, this notification may include an energy usage report including a graph depicting how consumption is driven by appliances in his or her residence or other location. Additional or alternative information may also be provided such as, for example, an indication that a discount is provided for reduced consumption for a specific period of time along with a suggestion as to how the subscriber can react to and profit from the discount. Furthermore, the environment 200 of the invention allows a utility provider to receive a SIP publish message or notification from a watcher (e.g., the watchers 265, 270, 275, and/or the utility manager 105). For instance, this notification may indicate that a subscriber's appliance is on or off, and the utility provider may then be able to decide to change the state of the appliance based on energy consumption rules associated with the subscriber (e.g., in the rules database 240).

In another example, the notification may indicate that a subscriber's electrical device or home power generation system has an electrical problem, such as a transient or sustained electrical fault, and/or indicate a significant deviation from the subscriber's typical power consumption. In response, the utility provider may then isolate the device, offload a feeder the device belongs to, and protect other electrical devices, while still providing the subscriber with reliable power. Alternatively, the utility provider may alert the subscriber via a SIP channel and the subscriber device (e.g., the subscriber device 210) to the possible electrical problem, allowing the subscriber to respond accordingly.

Advantageously, by quickly updating a subscriber with presence information of a smart meter (e.g., the smart meter 205) via a SIP channel, the subscriber can rapidly react to any notification in a temporally and channel-appropriate manner. For instance, the subscriber can react to a notification "out-of-band," e.g., turn off his or her appliance after receiving an energy overconsumption notification. In another example, the subscriber can react to a notification "in-band," e.g., send an SIP message via a smartphone to his or her smart meter at home to decrease a thermostat temperature. The invention's use of SIP and a presence server results in a smart grid that is more consumer-driven, consumer-focused, and event-driven, while being massively scalable, low in latency, and low in cost. Moreover, by being more consumer-driven, the smart grid is more decentralized from utility providers and more self-healing via consumer reactions.

Flow Diagram

Figure 3:
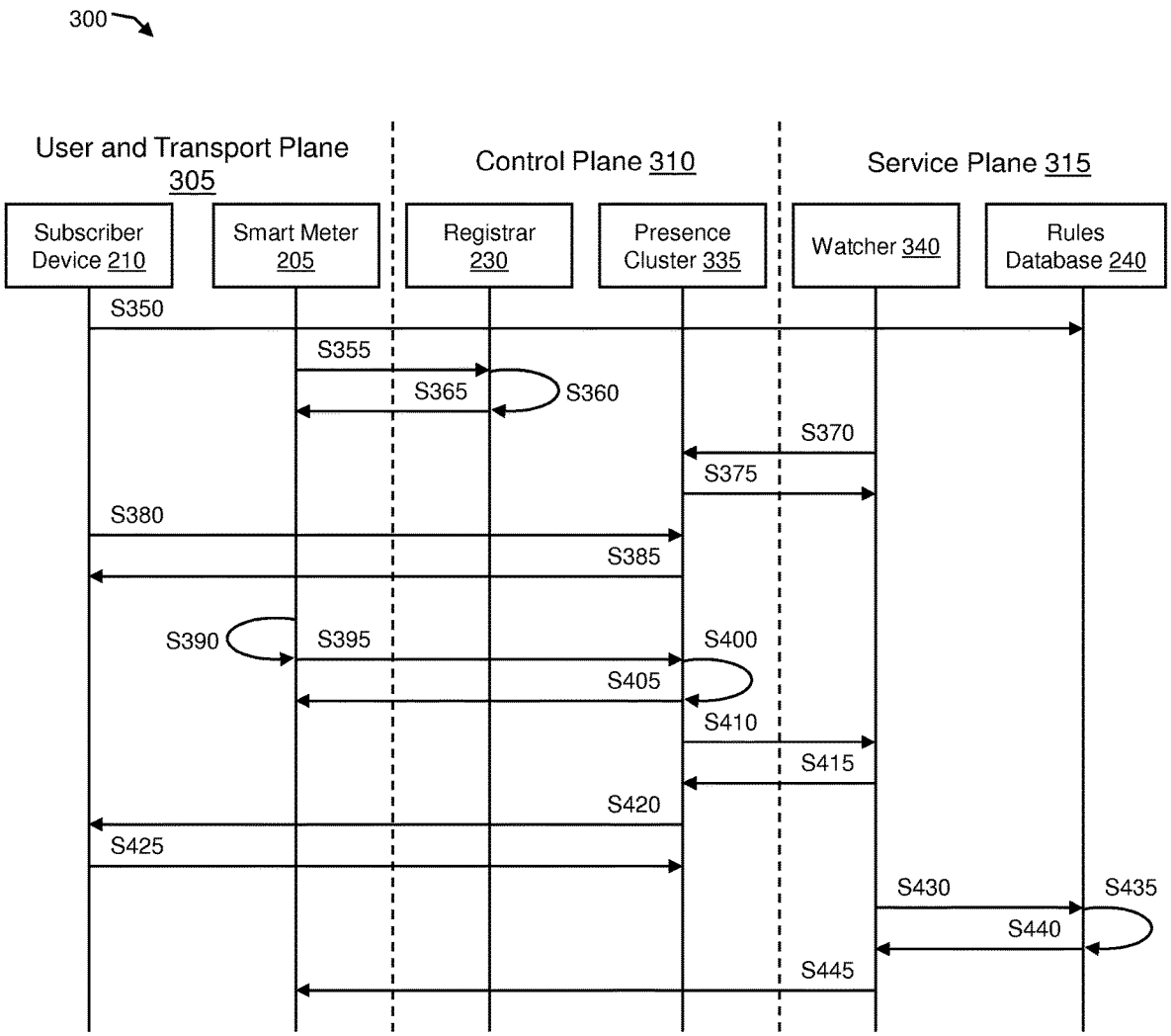
FIG. 3 shows an exemplary flow for managing events in a smart grid in accordance with aspects of the invention.
Figure 4:
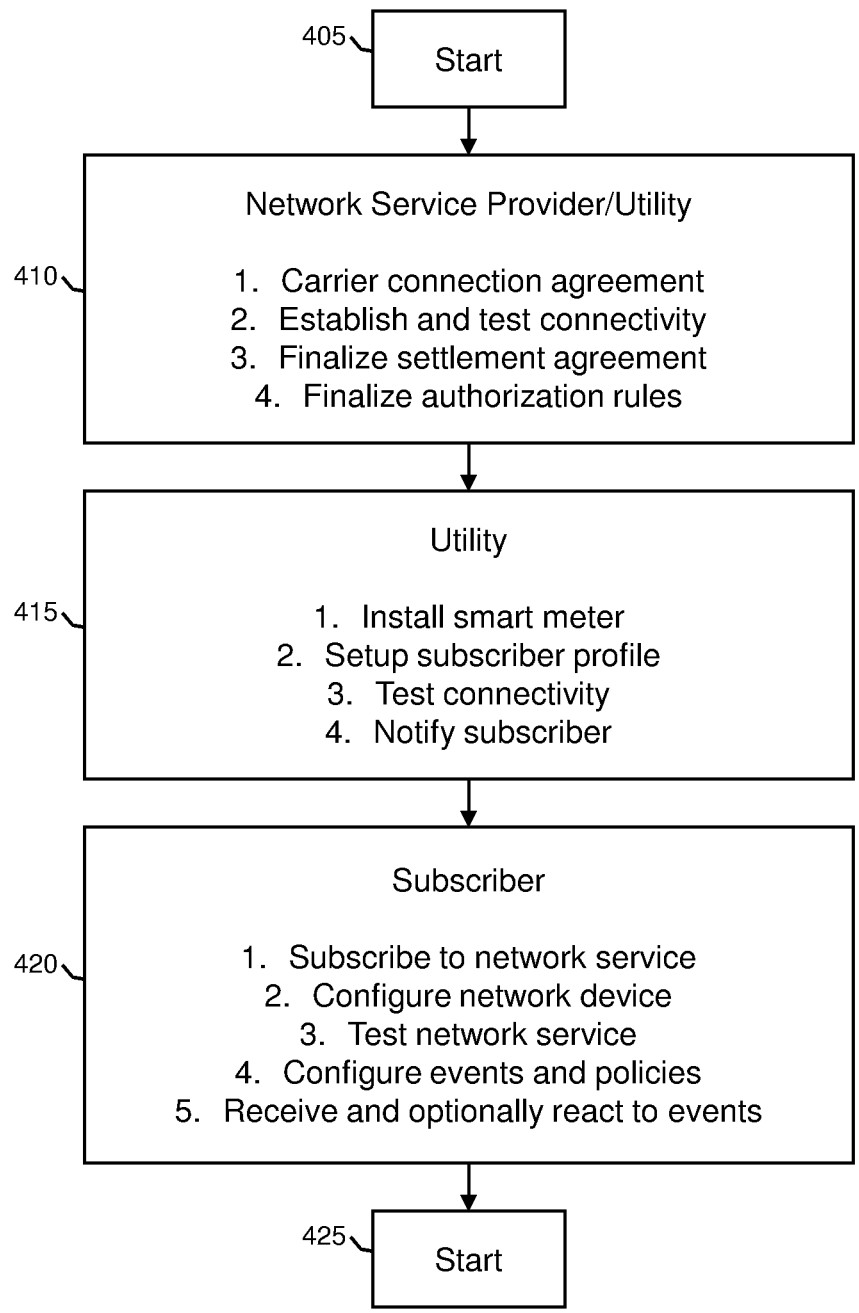
FIG. 4 shows an exemplary flow for provisioning the smart grid in accordance with aspects of the invention.

FIGS. 3-4 show exemplary flows for performing aspects of the present invention. The steps of FIG. 3-4 may be implemented in the environment of FIG. 2, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 3 depicts an exemplary flow for a process 300 of managing events in a smart grid in accordance with aspects of the present invention. The process 300 involves three players: a user and transport plane 305, a control plane 310, and a service plane 315. The user and transport plane 305 includes the subscriber device 210 and the smart meter 205, e.g. the subscriber device 210 and the smart meter 205 in FIG. 2. The control plane 310 includes the registrar 230 and a presence cluster 335, e.g., the S-CSCF/SIP registrar 230 and the presence cluster 235 and/or 255 in FIG. 2. The service plane 315 includes a watcher 340 and the rules database 240, e.g., one of the watchers 265, 270, 275, and/or the utility manager 105 and the rules database 240 in FIG. 2.

At step S350, the process starts, and the subscriber device 210 provisions a set of rules associated with specific event categories and event lists. These categories and lists are stored in the rules database 240. The event categories and lists may include actions to take, as and when the events occur. At step S355, the smart meter 205 sends a SIP register message via a gateway router (e.g., the load balancing layer 215) to the registrar 230, to register the smart meter 205 and/or the gateway router in the IMS/SIP network.

At step S360, the registrar 230 registers the smart meter 205 and/or the gateway router in the IMS/SIP network using SIP semantics, such as Initial Filter Criteria (iFC). At step S365, the registrar 230 sends a SIP acknowledgment message to the smart meter 205 that indicates that the smart meter 205 has been registered successfully. At step S370, the watcher 340 sends a SIP subscribe to the presence cluster 335 to subscribe to updates in presence information in the presence cluster 335, such as notifications of critical events at a premise. At step S375, the presence cluster 335 sends a SIP acknowledgment message to the watcher 340 that indicates that the watcher 340 has subscribed successfully with the presence cluster 335.

At step S380, the subscriber device 210 sends a SIP subscribe to the presence cluster 335 to subscribe to updates in presence information in the presence cluster 335, such as notifications of critical events. At step S385, the presence cluster 335 sends a SIP acknowledgment message to the subscriber device 210 that indicates that the subscriber device 210 has subscribed successfully with the presence cluster 335. At step S390, the smart meter 205 records or observes a critical event at a premise (e.g., energy overconsumption). At step S395, the smart meter 205 sends a SIP notify message including presence information of the critical event to the presence cluster 335.

At step S400, the presence cluster 335 processes the SIP notify message, including building or updating a presence document including the presence information and storing the presence document in a database, e.g., the subscriber/usage database 260. At step S405, the presence cluster 335 sends a SIP acknowledgement message to the smart meter 205 that indicates that the presence information has been received and processed. At step S410, the presence cluster 335 cycles through its watcher list and sends a SIP publish message or notifications to the watcher 340 that includes the updated presence information. At step S415, the watcher 340 sends a SIP acknowledgement message to the presence cluster 335 that indicates that the presence information has been received.

At step S420, the presence cluster 335 cycles through its watcher list and sends a SIP publish message or notifications to the subscriber device 210 that includes the updated presence information. At step S425, the subscriber device 210 sends a SIP acknowledgement message to the presence cluster 335 that indicates that the presence information has been received. At step S430, the watcher 340 requests a rule from the rules database 240 based on the notification of the critical event. At step S435, the rules database 240 processes the request, specifically, determining the actions to take based on the critical event. At step S440, the rules database 240 responds with the rule indicating the actions to take in response to the critical event. At step S445, the watcher 340 may send the rule indicating the actions to take to the smart meter 205 or may perform (initiate) actions necessary to make changes in the smart grid, such as control the smart meter 205. At step S445, the process ends.

FIG. 4 shows an exemplary flow for a process 400 of provisioning the smart grid in accordance with aspects of the invention. At step 405, the process starts. At step 410, a relationship and connection between a network service provider (e.g., a cellular network service) and a utility provider ("utility") is provisioned. Specifically, a carrier connection agreement and a settlement (business) agreement between the network service provider and the utility are finalized and agreed upon. Then, the network service provider and the utility provider establish and test their network domain connectivity, such as peering between presence clusters in their respective domains. The providers also finalize authorization rules of their network domains, or rules on how to connect to their respective network domains, e.g., telecommunication rules and/or SIP registration semantics.

At step 415, an electric grid of the utility is provisioned. Particularly, at least one smart meter is installed in the electric grid at a subscriber's premise and connected to network domains of the utility and the network service provider. A subscriber profile (e.g., an energy profile) is setup in the smart meter and in a rules database. The utility then tests the connectivity of the smart meter with the electric grid and the network domains. Then utility then notifies the subscriber of the connection of the smart meter at his or her premise.

At step 420, a subscriber is provisioned to use the smart grid and the network of the invention. Specifically, the subscriber subscribes to a network service operated by the network service provider, and configures his or her network device (e.g., a mobile device) for use in the network service.

The subscriber may then test the configured network device using the network service. Through the network device, the subscriber configures critical electrical events at his or her premise and other energy control rules, by communicating with a rules database in the network domain of the utility. The subscriber may also communicate with the presence clusters at the network domains of the utility and/or the network service provider to receive and possibly react to notifications of the critical events at his or her premise. At step 425, the process ends.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method of managing electrical consumption, comprising:
   providing a computer infrastructure, being operable to:
   send, by a smart meter of a subscriber, a Session Initiation Protocol (SIP) register message to a remote register in a network;
   monitor, by the smart meter, electrical consumption and potential critical electrical events of at least one electrical device connected to the smart meter;
   record, by the smart meter, the electrical consumption and a critical electrical event of the at least one electrical device at a client specified location, wherein the critical electrical event comprises at least one of a malfunction, a problem, and an electrical fault with the at least one electrical device;
   send, by the smart meter, a SIP notify message comprising presence information of the critical electrical event of the at least one electrical device at the client specified location, to a remote presence server in the network, wherein the presence server is configured to store presence information of the smart meter and a subscriber device of the subscriber;
   receive, by the smart meter, from a remote watcher device in communication with the presence server, at least one rule set by the subscriber wherein the at least one rule comprises at least one action to take in response to the critical electrical event; and
   perform, by the smart meter, the at least one action to take in response to the critical electrical event to initiate changes to the at least one electrical device.

2. The method of claim 1, wherein the sending the SIP register message and the sending the SIP notify message are performed utilizing a lightweight SIP client and a radio antenna connected to the SIP client of the smart meter, and wherein the network is a SIP network.

3. The method of claim 1, wherein the at least one electrical device is a consumer appliance.

4. The method of claim 3, wherein the consumer appliance is an air conditioner.

5. The method of claim 3, wherein the action to take in response to the critical electrical event is to turn off the consumer appliance.

6. A method of managing electrical consumption, comprising:
   sending, by a smart meter of a subscriber, a Session Initiation Protocol (SIP) register message to a remote register in a network;
   monitoring, by the smart meter, electrical consumption and potential critical electrical events of at least one electrical device connected to the smart meter;
   recording, by the smart meter, the electrical consumption and a critical electrical event of the at least one electrical device at a client specified location, wherein the critical electrical event comprises at least one of a malfunction, a problem, and an electrical fault with the at least one electrical device;
   sending, by the smart meter, a SIP notify message comprising presence information of the critical electrical event of the at least one electrical device at the client specified location, to a remote presence server in the network, wherein the presence server is configured to store presence information of the smart meter and a subscriber device of the subscriber;
   receiving, by the smart meter, a communication regarding at least one action to take in response to the critical electrical event; and
   performing, by the smart meter, the at least one action to take in response to the critical electrical event to initiate changes to the at least one electrical device.

7. The method of claim 6, wherein the at least one electrical device is a consumer appliance.

8. The method of claim 7, wherein the action to take in response to the critical electrical event is decreasing a thermostat temperature.

9. The method of claim 6, wherein the communication regarding the at least one action to take is in the form of an SIP message.

* * * * *